United States Patent
Morishita (10) Patent No.: US 10,761,783 B2
(45) Date of Patent: Sep. 1, 2020

(54) IMAGE FORMING SYSTEM AND IMAGE FORMING APPARATUS CONFIGURED TO TRANSMIT ADJUSTMENT ITEM DATA

(71) Applicant: KYOCERA Document Solutions Inc., Osaka (JP)

(72) Inventor: Yosuke Morishita, Osaka (JP)

(73) Assignee: Kyocera Document Solutons, Inc. (JP)

( * ) Notice: Subject to any disclaimer, the term of this patent is extended or adjusted under 35 U.S.C. 154(b) by 0 days.

(21) Appl. No.: 16/600,412

(22) Filed: Oct. 11, 2019

(65) Prior Publication Data
US 2020/0117402 A1 Apr. 16, 2020

(30) Foreign Application Priority Data
Oct. 15, 2018 (JP) ................................. 2018-194063

(51) Int. Cl.
*G06F 3/12* (2006.01)
(52) U.S. Cl.
CPC .......... *G06F 3/1205* (2013.01); *G06F 3/1253* (2013.01); *G06F 3/1292* (2013.01)
(58) Field of Classification Search
CPC .... G06F 3/1205; G06F 3/1292; G06F 3/1253; G06F 3/121; G06F 3/1234; H04N 1/00344; H04N 1/32609
See application file for complete search history.

(56) References Cited

U.S. PATENT DOCUMENTS
2013/0070299 A1 3/2013 Narahashi et al.

FOREIGN PATENT DOCUMENTS
JP 2017-068361 4/2017

*Primary Examiner* — Juan M Guillermety (57) ABSTRACT

A mobile terminal apparatus receives a setting reference value set of plural setting items for an image forming apparatus from a management server, and transmits it to the image forming apparatus using near field wireless communication. The image forming apparatus determines a setting item of which a current setting value is different from the setting reference value, and transmits through the near field wireless communication to the mobile terminal apparatus adjustment item data that indicates the determined setting item, the setting reference value and the current setting value. The mobile terminal apparatus displays the received adjustment item data, and transmits through the near field wireless communication to the image forming apparatus an adjustment instruction that indicates a setting value of a setting item specified by a user in the adjustment item data. The image forming apparatus changes a setting value in accordance with the received adjustment instruction.

4 Claims, 5 Drawing Sheets

```
SETTING REFERENCE VALUE SET

<setting>
    <data1>10</data1>
    <data2>ON</data2>
    <data3>MODE1</data3>
  </setting>
```

IMAGE FORMING SYSTEM AND IMAGE FORMING APPARATUS CONFIGURED TO TRANSMIT ADJUSTMENT ITEM DATA

CROSS-REFERENCE TO RELATED APPLICATIONS

This application relates to and claims priority rights from Japanese Patent Application No. 2018-194063, filed on Oct. 15, 2018, the entire disclosures of which are hereby incorporated by reference herein.

BACKGROUND

1. Field of the Present Disclosure

The present disclosure relates to an image forming system and an image forming apparatus.

2. Description of the Related Art

In a maintenance system, when an error occurs in an image forming apparatus, a user's mobile terminal device receives information on an error status of the image forming apparatus using a near field data communication, receives information on a recovery procedure against the error status from a maintenance server or the like, and displays the information on the recovery procedure to the user.

However, if an error or an undesired operation result (e.g. printed matter) occurs due to setting values of plural setting items in the image forming apparatus, then it is not favorable that in accordance with the recovery procedure, the user operates the image forming apparatus and thereby manually adjusts the setting values, because complicated operations are required and an operation mistake may occur.

Further, in the aforementioned maintenance system, if plural times of fine adjustments are required to remove an error, the error may not be removed with one-time operation based on the displayed recovery procedure.

SUMMARY

An image forming system according to an aspect of the present disclosure includes an image forming apparatus configured to perform an action according to setting values of plural setting items; a mobile terminal apparatus capable of communicating with the image forming apparatus through near field wireless communication; and a management server configured to transmit a setting reference value set of the plural setting items to the mobile terminal apparatus, without communicating with the image forming apparatus. Further, the mobile terminal apparatus receives the setting reference value set for the image forming apparatus from the management server, and transmits the received setting reference value set to the image forming apparatus using the near field wireless communication. The image forming apparatus receives the setting reference value set from the mobile terminal apparatus through the near field wireless communication, and upon receiving the setting reference value set, (a) determines current setting values of the plural setting items, (b) determines a setting item of which the current setting value is different from a setting value in the setting reference value set, and (c) transmits adjustment item data through the near field wireless communication to the mobile terminal apparatus, the adjustment item data indicating (c1) the determined setting item, and (c2) the setting value in the setting reference value set and the current setting value with regard to the determined setting item. The mobile terminal apparatus receives the adjustment item data through the near field wireless communication from the image forming apparatus, and upon receiving the adjustment item data, (a) displays the received adjustment item data, and (b) transmits an adjustment instruction through the near field wireless communication to the image forming apparatus in accordance with a user operation, the adjustment instruction indicating a setting value of a setting item specified by a user in the adjustment item data. The image forming apparatus receives the adjustment instruction through the near field wireless communication from the mobile terminal apparatus, and upon receiving the adjustment instruction, changes a setting value of the setting item specified by the received adjustment instruction, with the setting value specified by the received adjustment instruction.

An image forming apparatus according to an aspect of the present disclosure is an image forming apparatus configured to perform an action according to setting values of plural setting items, and capable of communicating with a mobile terminal apparatus through near field wireless communication, and includes a near field wireless communication device configured to perform the near field wireless communication; and a setting adjusting unit. Further, the setting adjusting unit is configured to (a) receive a setting reference value set of the plural setting items through the near field wireless communication from the mobile terminal apparatus, the setting reference value set acquired by the mobile terminal apparatus from a management server; (b) determine current setting values of the plural setting items upon receiving the setting reference value set; (c) determine a setting item of which a current setting value is different from a setting value in the setting reference value set; (d) transmit adjustment item data through the near field wireless communication to the mobile terminal apparatus, the adjustment item data indicating (d1) the determined setting item, and (d2) the setting value in the setting reference value set and the current setting value with regard to the determined setting item; (e) receive an adjustment instruction through the near field wireless communication from the mobile terminal apparatus in accordance with a user operation after the mobile terminal apparatus displays the adjustment item data, the adjustment instruction indicating a setting value of a setting item specified by a user in the adjustment item data; and (f) change a setting value of the setting item specified by the received adjustment instruction, with the setting item specified by the received adjustment instruction.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
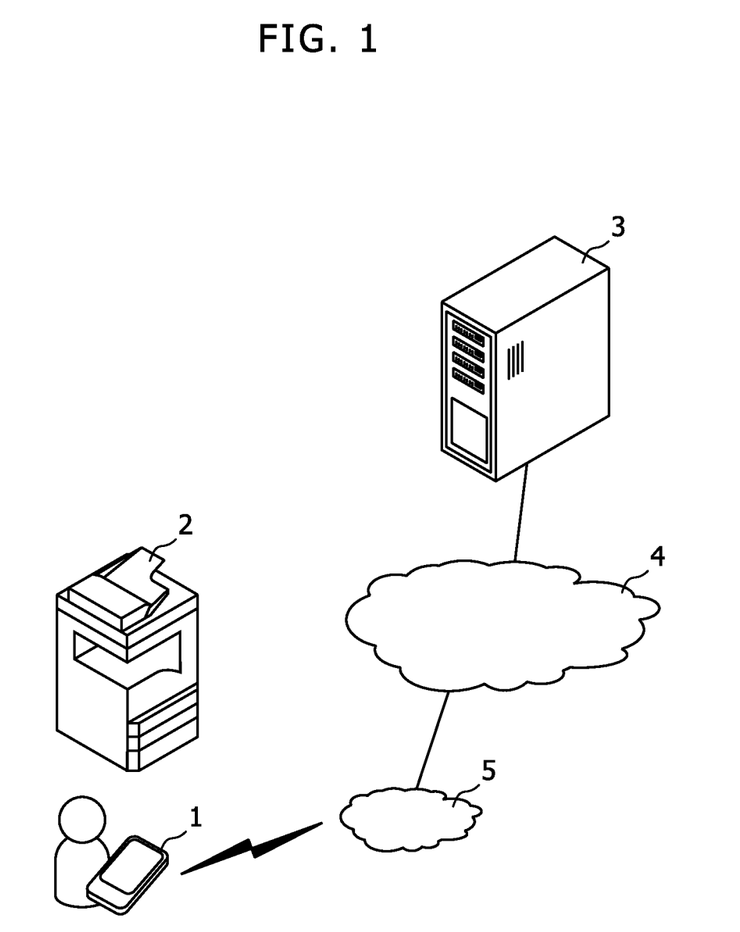
FIG. 1 shows a block diagram that indicates a configuration of an image forming system in an embodiment of the present disclosure.
Figure 2:
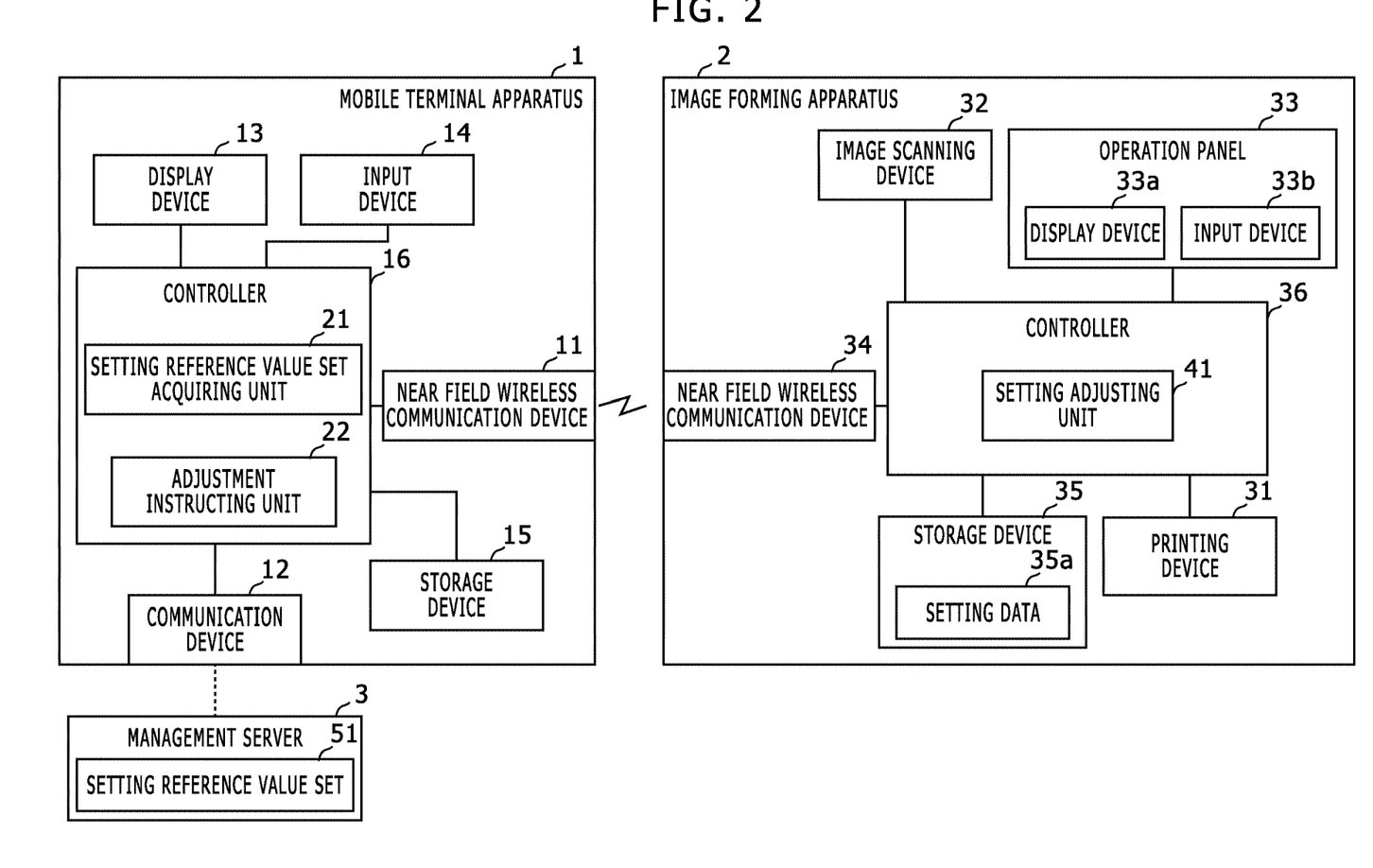
FIG. 2 shows a block diagram that indicates configurations of a mobile terminal apparatus 1 and an image forming apparatus 2 shown in FIG. 1.

FIG. 1 shows a block diagram that indicates a configuration of an image forming system in an embodiment of the present disclosure. FIG. 2 shows a block diagram that indicates configurations of a mobile terminal apparatus 1 and an image forming apparatus 2 shown in FIG. 1.

The system shown in FIG. 1 includes a mobile terminal apparatus 1 carried by a user, an image forming apparatus 2 (such as multi function peripheral, printer or copier) used by the user, and a maintenance server 3.

The management server 3 is connected to a computer network 4 such as Internet. The mobile terminal apparatus 1 is, for example, a mobile device such as smart phone or tablet terminal, is capable of connecting to the computer network 4 through a cellular phone communication network 5, and therefore is capable of communicating with the management server 3 through the cellular phone communication network 5 and the computer network 4. Contrarily, the image forming apparatus 2 is not capable of communicating with the management server 3.

The mobile terminal apparatus 1 is capable of communicating with the image forming apparatus 2 through near field wireless communication. The image forming apparatus 2 performs an action according to setting values of plural setting items. For example, with regard to printing, a blank on a printing sheet is set in accordance with setting values of printing setting items. The management server 3 transmits a setting reference value set 51 of the plural setting items for the image forming apparatus 2 to the mobile terminal apparatus 1, without communicating with the image forming apparatus 2. The setting reference value set 51 includes as setting reference values initial setting values (default setting values) of the plural setting items.

The mobile terminal apparatus 1 includes a near field wireless communication device 11, a communication device 12 for the cellular phone communication network 5, a display device 13, an input device 14, a storage device 15, a controller 16, and the like.

The near field wireless communication device 11 is an internal device that performs data communication according to a predetermined wireless communication standard such as Bluetooth (registered trademark). The communication device 12 is a communication device capable of accessing the cellular phone communication network 5 through wireless communication.

The display device 13 is an internal device such as a liquid crystal display, that displays an operation screen and the like for a user. The input device 14 is an internal device such as a touch panel, that detects a user operation. The storage device 15 is a nonvolatile storage device such as a flash memory and stores a program and data.

The controller 16 controls internal devices in the mobile terminal apparatus 1 and performs sorts of data processes. The controller 16 includes an ASIC (Application Specific Integrated Circuit) and/or a computer which includes a CPU (Central Processing Unit), a ROM (Read Only Memory), a RAM (Random Access Memory) and the like, and loads an application program from the ROM or the storage device 15 to the RAM and executes it using the CPU and thereby acts as a setting reference value set acquiring unit 21 and an adjustment instructing unit 22.

The setting reference value set acquiring unit 21 receives a setting reference value set for the image forming apparatus 2 from the management server 3 using the communication device 12, and transmits the setting reference value set to the image forming apparatus 2 through near field wireless communication using the near field wireless communication device 11.

Figure 3:
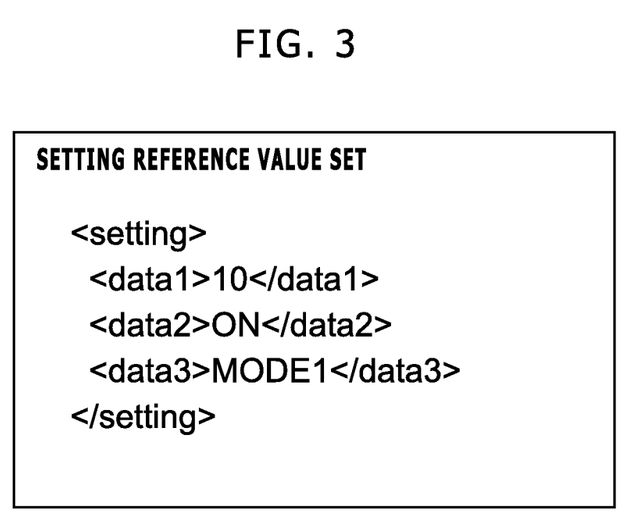
FIG. 3 shows a diagram that indicates an example of a setting reference value set.

FIG. 3 shows a diagram that indicates an example of a setting reference value set. As shown in FIG. 3, for example, the setting reference value set is described in XML (Extensible Markup Language), and indicates a setting reference value with an XML element having a name of a setting item. Specifically, in the XML element, the setting reference value is put between tags of the setting item name. In the setting reference value set shown in FIG. 3, the setting reference value of the setting item "data1" is set as "10", the setting reference value of the setting item "data2" is set as "ON", and the setting reference value of the setting item "data3" is set as "MODE1".

Returning to FIG. 2, the adjustment instructing unit 22 receives adjustment item data (mentioned below) through the near field wireless communication from the image forming apparatus 2 using the near field wireless communication device 11, and upon receiving the adjustment item data, (a) display the received adjustment item data, and (b) transmits an adjustment instruction through the near field wireless communication to the image forming apparatus 2 using the near field wireless communication device 11 in accordance with a user operation to the input device 14. Here, the adjustment instruction indicates a setting value of a setting item specified by a user in the adjustment item data.

Meanwhile, the image forming apparatus 2 include a printing device 31, an image scanning device 32, an operation panel 33, a near field wireless communication device 34, a storage device 35, and a controller 36.

The printing device 31 is an internal device that performs printing an image on a printing sheet in an electrographic manner page by page on the basis of printing image data, in accordance with setting values in setting data 35a. The image scanning device 32 is an internal device that optically scans a document image of a document and thereby generates image data of the document image, in accordance with setting values in setting data 35a.

The operation panel 33 is arranged on a surface of a housing of the image forming apparatus 2, and includes a display device 33a that displays sorts of messages to a user and an input device 33b that receives a user operation. For example, a liquid crystal display is used as the display device 33a. A key switch, a touch panel or the like is used as the input device 33b.

The near field wireless communication device 34 is an internal device that performs data communication according to a predetermined near field wireless communication standard such as Bluetooth (registered trademark).

Further, the storage device 35 is a nonvolatile storage device such as a flash memory or a hard disk. The setting data 35a is stored in the storage device 35, and indicates setting values of various setting items for the aforementioned internal devices.

Furthermore, the controller 36 performs controlling the internal devices in the image forming apparatus and data processing in accordance with a user operation performed to the operation panel 33, and thereby performs sorts of jobs (print job, copy job, facsimile transmission job, and the like). The controller 36 includes a computer, an ASIC and/or the like for controlling the internal devices in the image forming apparatus 2. The controller 36 executes a program with the computer and thereby acts as a setting adjusting unit 41.

The setting adjusting unit 41 receives the setting reference value set from the mobile terminal apparatus 1 through the near field wireless communication using the near field wireless communication device 34, and upon receiving the setting reference value set, (a) determines current setting values of the plural setting items on the basis of the setting data 35a, (b) determines a setting item of which the current setting value is different from a setting value in the setting reference value set, and (c) transmits adjustment item data through the near field wireless communication to the mobile terminal apparatus 1 using the near field wireless communication device 34. Here, the adjustment item data indicates (a) the determined setting item, and (b) the setting value in the setting reference value set and the current setting value with regard to the determined setting item. Further, the setting adjusting unit 41 receives the adjustment instruction through the near field wireless communication from the mobile terminal apparatus 1 using the near field wireless communication device 34, and upon receiving the adjustment instruction, changes in the setting data 35a a setting value of the setting item specified by the received adjustment instruction with the setting value specified by the received adjustment instruction.

Figure 4:
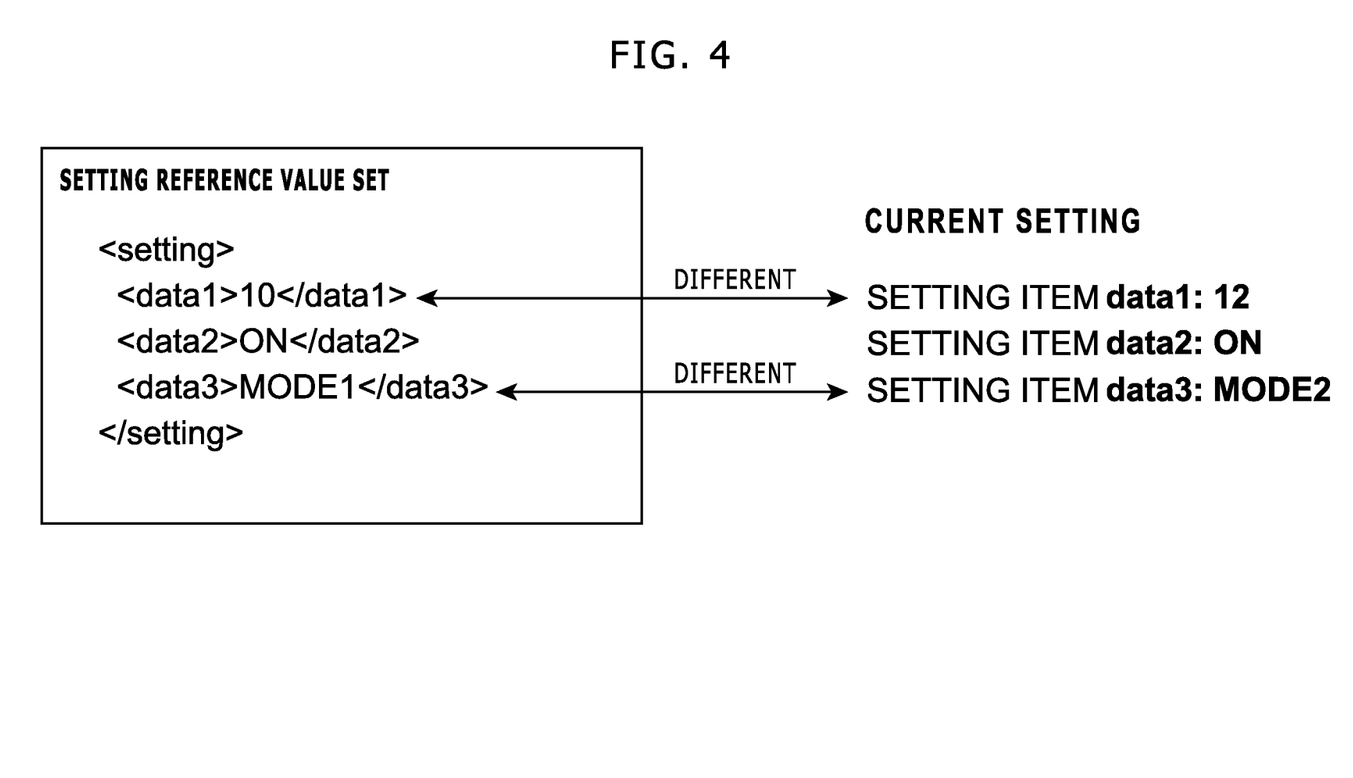
FIG. 4 shows a diagram that explains detection of a difference between a setting value in a setting reference value set and a current setting value.

FIG. 4 shows a diagram that explains detection of a difference between a setting value in a setting reference value set and a current setting value. For example, if the setting reference value set shown in FIG. 3 is received, and the current setting values shown in FIG. 4 are determined, then as shown in FIG. 4, differences are detected on the setting values of the setting items "data1" and "data3", and consequently, the setting items "data1" and "data3" are determined as a cause of the error. In this case, the adjustment item data indicates (a) the setting items "data1" and "data3", (b) the setting reference values of the setting items "data1" and "data3", and (c) the current setting values of the setting items "data1" and "data3". Thus, the adjustment item data does not indicate the setting item "data2" (and also does not indicate a setting reference value and a current setting value of it) because the setting reference value and the current setting value are identical to each other with regard to the setting item "data2".

Figure 5:
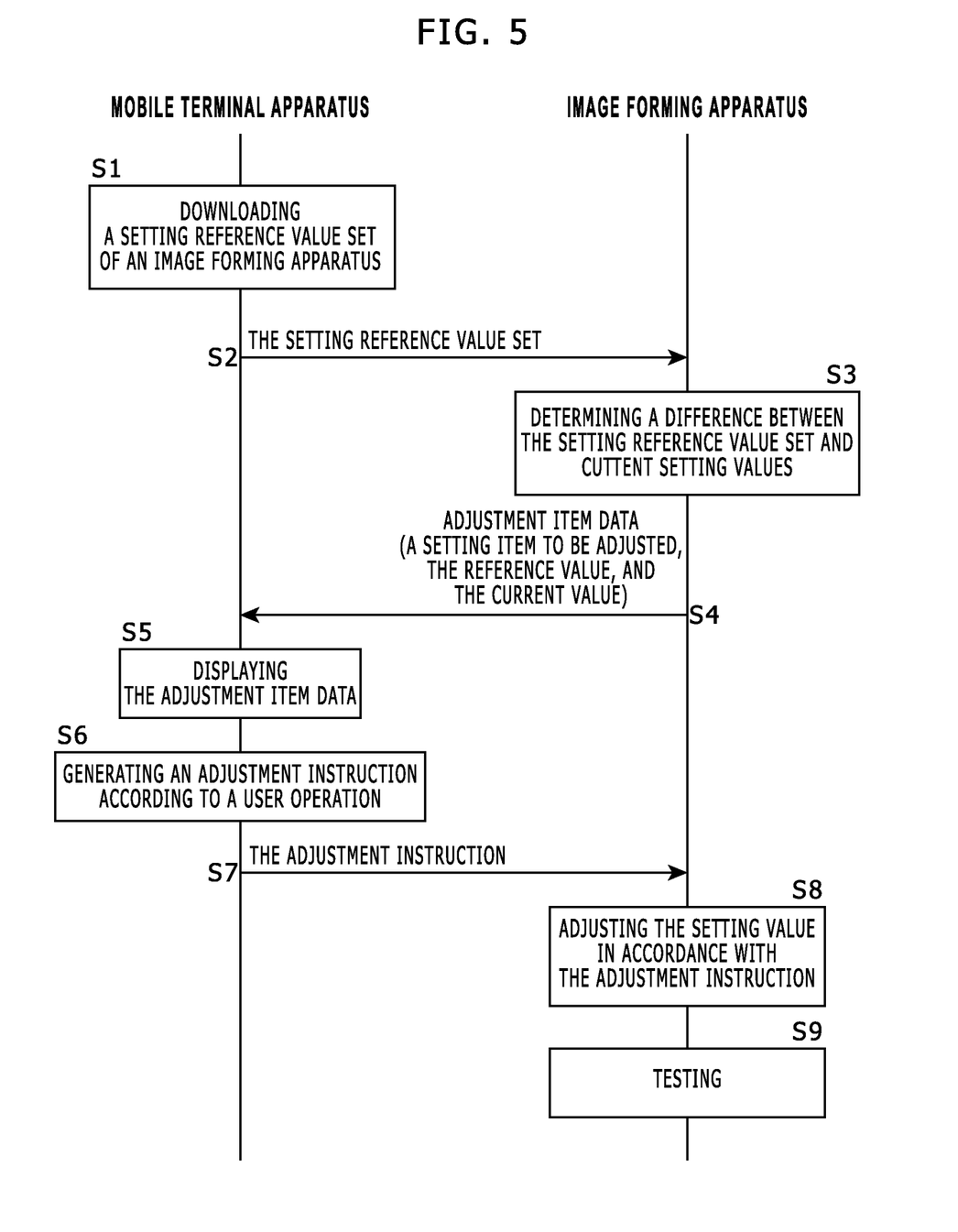
FIG. 5 shows a sequence diagram that explains a behavior of the image forming system shown in FIG. 1.

The following part explains a behavior of the aforementioned image forming system. FIG. 5 shows a sequence diagram that explains a behavior of the image forming system shown in FIG. 1.

In the mobile terminal apparatus 1, upon detecting a predetermined user operation with the input device 14, the setting reference value set acquiring unit 21 determines a machine type of an image forming apparatus 2 capable of communicating with the near field wireless communication device 11, for example, through the near field wireless communication, transmits a download request of a setting reference value set for the determined machine type to the management server 3 for such that the download request specifies the determined machine type, and receives a setting reference value set from the management server 3 (in Step S1).

The setting reference value set acquiring unit 21 transmits the downloaded setting reference value set to the image forming apparatus 2 using the near field wireless communication device 11 (in Step S2).

In the image forming apparatus 2, the setting adjusting unit 41 receives the setting reference value set from the mobile terminal apparatus 1 using the near field wireless communication device 34, and determines a setting item of which a current setting value in this image forming apparatus 2 (i.e. in the setting data 35a) is different from a setting reference value indicated by the received setting reference value set (in Step S3).

Subsequently, the setting adjusting unit 41 generates adjustment item data and transmits the adjustment item data to the mobile terminal apparatus 1 using the near field wireless communication device 34 (Step S4). Here, the adjustment item data indicates (a) a setting item of which a current setting value is out of a setting reference value, (b) the setting reference value, and (c) the current setting value.

In the mobile terminal apparatus 1, the adjustment instructing unit 22 receives the adjustment item data using the near field wireless communication device 11, and displays the received adjustment item data on the display device 13 (in Step S5).

Consequently, the user can visually confirm the adjustment item data on the mobile terminal apparatus 1, and on the basis of a setting reference value and a current setting value of a setting item specified by the adjustment item data, the user selects a setting value of a setting item to be adjusted (e.g. the setting reference value, an intermediate value between the setting reference value and the current setting value), and specifies the selected setting value of the setting item to be adjusted into the mobile terminal apparatus 1 using the input device 14.

Using the input device 14, the adjustment instructing unit 22 detects the setting value specified by the user as a setting value of the setting item to be adjusted, and transmits an adjustment instruction to the image forming apparatus 2 using the near field wireless communication device 11 (in Step S17). Here, the adjustment instruction indicates this setting value of the setting item to be adjusted.

In the image forming apparatus 2, the setting adjusting unit 41 receives the adjustment instruction using the near field wireless communication device 34, and in accordance with the received adjustment instruction, changes a setting value in this image forming apparatus 2, of the setting item specified by the adjustment instruction, with the setting value specified by the adjustment instruction (in Step S8).

After at least one setting value is adjusted in the aforementioned manner, the user causes the image forming apparatus 2 to perform a test action (e.g. test print) (in Step S9), and determines whether the error has been removed or not on the basis of an action result of the test action (e.g. printed matter).

If the error has been removed, the user perform inputting an instruction for terminating this process to the input device 14 of the mobile terminal apparatus 1, and otherwise if the error has not been removed, returning to Step S6, the user specifies the setting value(s) again, and the mobile terminal apparatus 1 causes the image forming apparatus 2 to perform the adjustment of the setting value(s) again.

As mentioned, in the aforementioned embodiment, the mobile terminal apparatus 1 receives a setting reference value set for the image forming apparatus 2 from the management server 3, and transmits the received setting reference value set to the image forming apparatus 2 through near field wireless communication. The image forming apparatus 2 receives the setting reference value set from the mobile terminal apparatus 1 through the near field wireless communication, and upon receiving the setting reference value set, (a) determines current setting values of the plural setting items, (b) determines a setting item of which the current setting value is different from a setting value in the setting reference value set, and (c) transmits adjustment item data through the near field wireless communication to the mobile terminal apparatus 1. Here, the adjustment item data indicates (c1) the determined setting item, and (c2) the setting value in the setting reference value set and the current setting value with regard to the determined setting item. The mobile terminal apparatus 1 receives the adjustment item data through the near field wireless communication from the image forming apparatus 2, and upon receiving the adjustment item data, (a) displays the received adjustment item data, and (b) transmits an adjustment instruction through the near field wireless communication to the image forming apparatus 2 in accordance with a user operation. Here, the adjustment instruction indicates a setting value of a setting item specified by a user in the adjustment item data. The image forming apparatus 2 receives the adjustment instruction through the near field wireless communication from the mobile terminal apparatus 1, and upon receiving the adjustment instruction, changes a setting value of the setting item specified by the received adjustment instruction, with the setting value specified by the received adjustment instruction.

Consequently, when an error occurs, a setting item that causes the error is displayed on the user's mobile terminal apparatus 1, and a setting reference value and a current setting value are also displayed of this setting item, and therefore, the user can remove the error due to setting values of plural setting items with a simple manual operation.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the mobile terminal apparatus (the setting reference value set acquiring unit 21) 1 may notify the maintenance server 3 of (a) a machine type of the image forming apparatus 2 and (b) an error type of the image forming apparatus 2; and the management server 3 may select a setting reference value set corresponding to the machine type and the error type from plural setting reference values, and transmit the selected setting reference value set to the mobile terminal apparatus 1 (the setting reference value set acquiring unit 21).

Further, in the aforementioned embodiment, the setting reference value set 51 may include a setting value adjustment guidance for each of the setting items. In such a case, the mobile terminal apparatus 1 displays the setting value adjustment guidance of the setting items specified by the adjustment item data when displaying the adjustment item data. For example, the setting value adjustment guidance includes explanation of the setting item, options of the setting value, explanation of an effect of changing the setting value and/or the like.

Furthermore, in the aforementioned embodiment, the image forming apparatus 2 includes the operation panel 33, but may not include the operation panel 33 and if the operation panel 33 is not included, the mobile terminal apparatus 1 is alternatively used as a user interface.

Furthermore, in the aforementioned embodiment, the image forming apparatus 2 does not include any network interfaces, but may include a network interface. However, even if the image forming apparatus 2 includes a network interface, the image forming apparatus 2 is installed in an environment such that the image forming apparatus 2 can not communicate with the management server 3.

What is claimed is:

1. An image forming system, comprising:
an image forming apparatus configured to perform an action according to setting values of plural setting items;
a mobile terminal apparatus capable of communicating with the image forming apparatus through near field wireless communication; and
a management server configured to transmit a setting reference value set of the plural setting items to the mobile terminal apparatus, without communicating with the image forming apparatus;
wherein the mobile terminal apparatus receives the setting reference value set for the image forming apparatus from the management server, and transmits the received setting reference value set to the image forming apparatus using the near field wireless communication;
the image forming apparatus receives the setting reference value set from the mobile terminal apparatus through the near field wireless communication, and upon receiving the setting reference value set, (a) determines current setting values of the plural setting items, (b) determines a setting item of which the current setting value is different from a setting value in the setting reference value set, and (c) transmits adjustment item data through the near field wireless communication to the mobile terminal apparatus, the adjustment item data indicating (c1) the determined setting item, and (c2) the setting value in the setting reference value set and the current setting value with regard to the determined setting item;
the mobile terminal apparatus receives the adjustment item data through the near field wireless communication from the image forming apparatus, and upon receiving the adjustment item data, (a) displays the received adjustment item data, and (b) transmits an adjustment instruction through the near field wireless communication to the image forming apparatus in accordance with a user operation, the adjustment instruction indicating a setting value of a setting item specified by a user in the adjustment item data; and
the image forming apparatus receives the adjustment instruction through the near field wireless communication from the mobile terminal apparatus, and upon receiving the adjustment instruction, changes a setting value of the setting item specified by the received adjustment instruction, with the setting value specified by the received adjustment instruction.

2. The image forming system according to claim 1, wherein
the mobile terminal apparatus notifies the maintenance server of (a) a machine type of the image forming apparatus and (b) an error type of the image forming apparatus; and
the management server selects a setting reference value set corresponding to the machine type and the error type from plural setting reference values, and transmits the selected setting reference value set to the mobile terminal apparatus.

3. The image forming system according to claim 1, wherein
the setting reference value set includes a setting value adjustment guidance for each of the setting items; and the mobile terminal apparatus displays the setting value adjustment guidance of the setting items specified by the adjustment item data when displaying the adjustment item data.

4. An image forming apparatus configured to perform an action according to setting values of plural setting items, and capable of communicating with a mobile terminal apparatus through near field wireless communication, comprising:

a near field wireless communication device configured to perform the near field wireless communication; and a setting adjusting unit configured to (a) receive a setting reference value set of the plural setting items through the near field wireless communication from the mobile terminal apparatus, the setting reference value set acquired by the mobile terminal apparatus from a management server; (b) determine current setting values of the plural setting items upon receiving the setting reference value set; (c) determine a setting item of which a current setting value is different from a setting value in the setting reference value set; (d) transmit adjustment item data through the near field wireless communication to the mobile terminal apparatus, the adjustment item data indicating (d1) the determined setting item, and (d2) the setting value in the setting reference value set and the current setting value with regard to the determined setting item; (e) receive an adjustment instruction through the near field wireless communication from the mobile terminal apparatus in accordance with a user operation after the mobile terminal apparatus displays the adjustment item data, the adjustment instruction indicating a setting value of a setting item specified by a user in the adjustment item data; and (f) change a setting value of the setting item specified by the received adjustment instruction, with the setting item specified by the received adjustment instruction.

* * * * *